H. Ogborn,
Line Fastener.
No. 100,138. Patented Mar. 1, 1870.
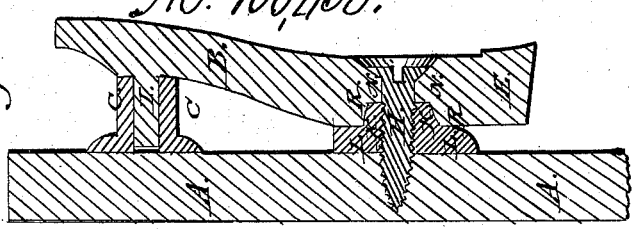
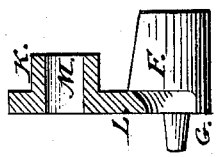
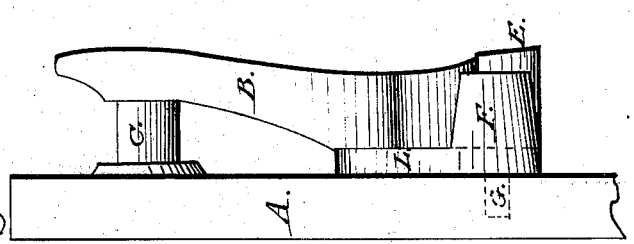
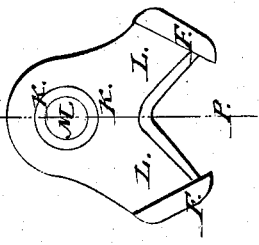
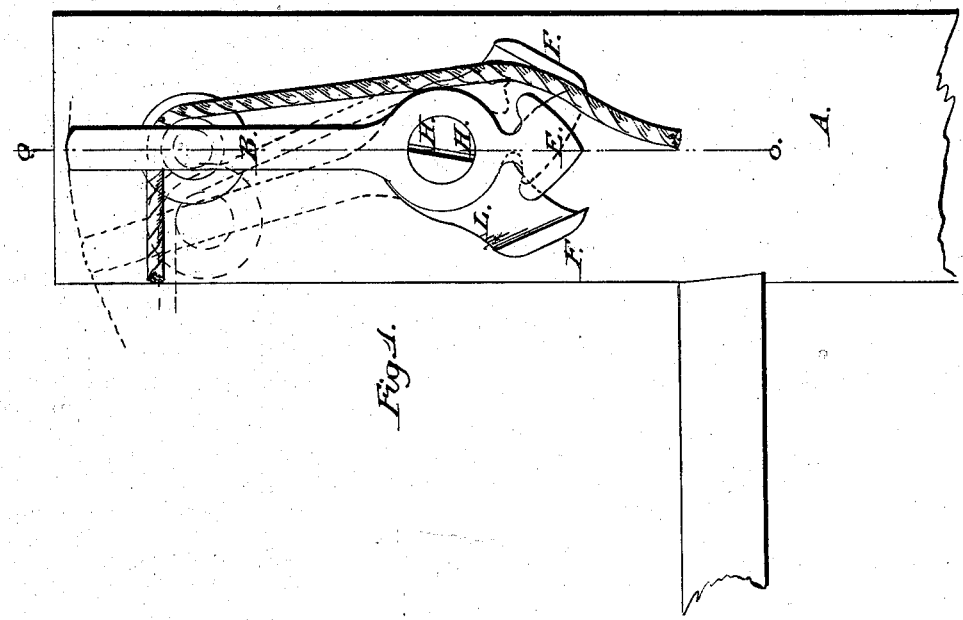
WITNESSES:
C. F. Clausen.
J. M. Blanchard.
INVENTOR:
Harrison Ogborn.

UNITED STATES PATENT OFFICE.

HARRISON OGBORN, OF RICHMOND, INDIANA.

IMPROVED CLOTHES-LINE FASTENER.

Specification forming part of Letters Patent No. 100,438, dated March 1, 1870; antedated February 25, 1870.

*To all whom it may concern:*

Be it known that I, HARRISON OGBORN, of Richmond, in the county of Wayne and State of Indiana, have invented new and useful Improvements in Fibrous or Metallic Clothes-Line Fasteners; and I hereby declare the following to be a full, clear, and exact description of the same, reference being had to the accompanying drawings, making part of this specification, in which—

Figure 1 is a front elevation of my invention as attached to a post with the line in position. Fig. 2 is a side elevation of the same. Fig. 3 is a transverse vertical section of the same, as at red lines O O in Fig. 1. Fig. 4 is a detached front view of the part that attaches directly to the post. Fig. 5 is a detached sectional view of the same, taken in red line P P, Fig. 4.

The nature of my invention consists in new and improved mode of attaching, stretching, holding, and detaching clothes and other lines.

A in the drawings represents a post, to which the holder is attached by means of the screw H passing through the holes N and M in the lever B and plate L.

C is a pulley which revolves on and is held in position by the pin I.

E is the part of the lever that holds the line in position.

F F are arms or projections on the plate L, against which the line is held.

G G are pins on the back part of the plate L for holding it in position.

K is a hollow socket on plate L, which fits into the recess or chamber R in the lever B, as shown in Fig. 3.

The operation of my invention is as follows: The line being made fast at one end, the other is drawn over the pulley C and down between the part E of the lever B, and part F of plate L, and drawn tightly downward between them. The weight and tension of the long part of the line draws the lever B forward, as shown in red lines, thus pressing and holding the line firmly between the parts E and F. If it is desired to bring the line from the opposite direction, it will be held equally well by simply reversing the position of the line to the other side. The pulley C prevents the friction on the line that would occur without it.

Having thus described the nature, construction, and operation of my invention, what I claim therein as new and useful, and desire to secure by Letters Patent, is—

The construction of lever B with pulley C, in combination with plate L and projections F F, when used for the purposes and in the manner described.

HARRISON OGBORN.

Witnesses:
EDM. F. BROWN,
J. M. BLANCHARD.